Nov. 15, 1927.
W. J. OAKLEY
1,649,723
SECTIONAL TIRE CORE
Filed Jan. 22, 1926
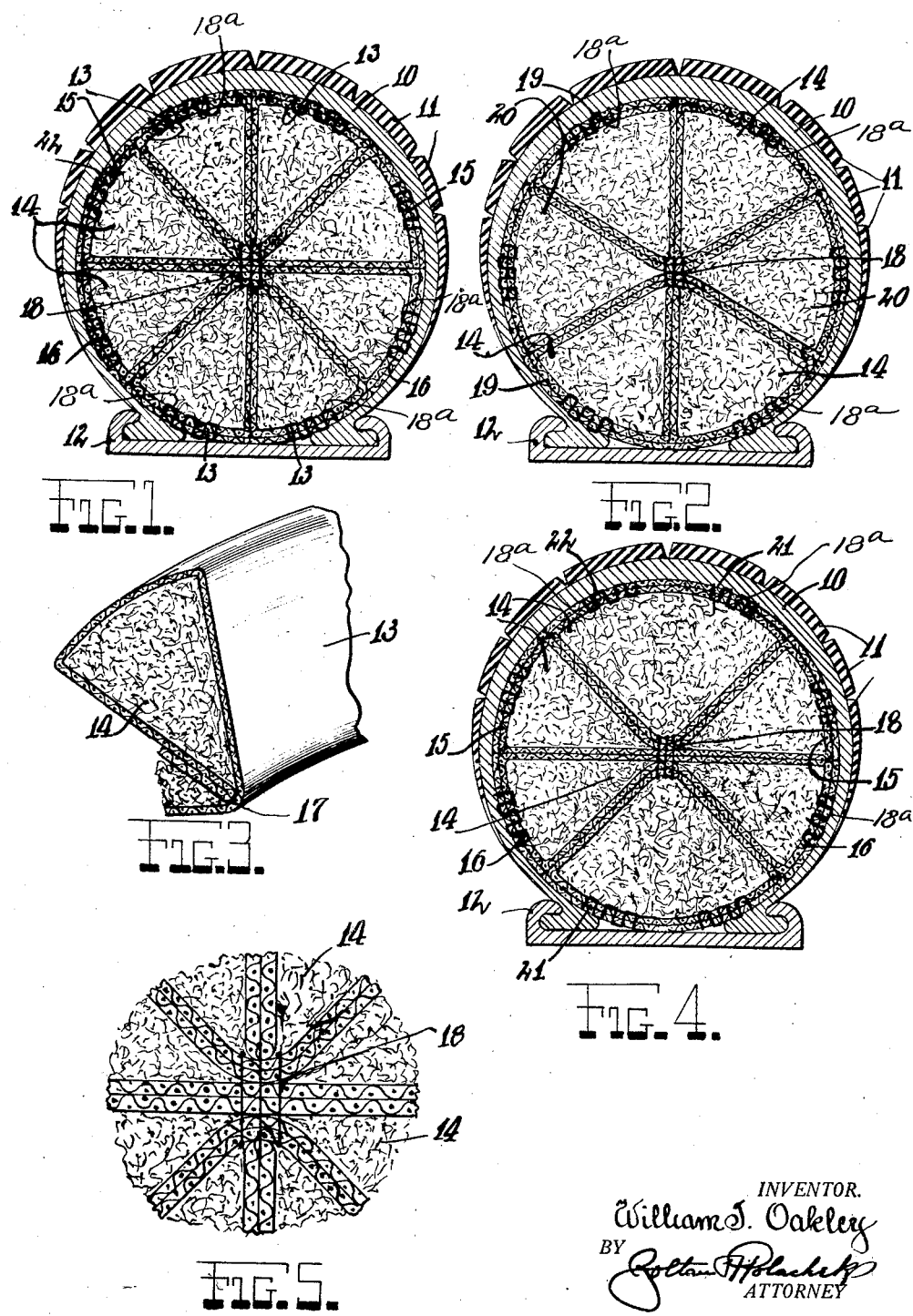

Patented Nov. 15, 1927.

1,649,723

UNITED STATES PATENT OFFICE.

WILLIAM J. OAKLEY, OF BROOKLYN, NEW YORK.

SECTIONAL TIRE CORE.

Application filed January 22, 1926. Serial No. 83,004.

This invention relates generally to enclosed cores used in motor vehicle tires and the like, the invention having more particular reference to a novel type of enclosed core.

The invention has for an object the provision of an improved enclosed core.

A further object is to provide an enclosed core having resilient qualities.

Another object is to provide an enclosed core easily and cheaply manufactured, and one which may be readily inserted in a tire or shoe.

For further comprehension of the invention, and of the objects and advantages thereof, reference will be had to the following description and accompanying drawing, and to the appended claims in which the various novel features of the invention are more particularly set forth.

Fig. 1 of the drawing, shows a sectional view of a tire applied to a rim, with my improved enclosed core in place.

Fig. 2 of the drawing, shows a similar view of a modification of my improved enclosed core.

Fig. 3 of the drawing, shows an enlarged fragmentary perspective view in section, of one of the sections of my improved enclosed core.

Fig. 4 of the drawing, shows a sectional view of a tire applied to a rim, with a further modification of my improved enclosed core in place.

Fig. 5 of the drawing, shows an enlarged detail view of the center portions of my improved enclosed core.

The shoe, or tire 10, has a tread 11, and is attached to the rim 12, the above mentioned elements or parts being such as ordinarily used to accommodate an inner tube which is filled with air under pressure, such as commonly used for motor vehicles, and the like. It being understood that my improved enclosed core replaces the above mentioned ordinary inner tube.

As here embodied my improved device comprises a plurality of containers, preferably of fabric, designated by the numeral 13. The containers 13 are sectors of 45° each. It will be understood that the two containers, designated by the reference numeral 15 located above the longitudinal center line of the said tire 10, are each formed from one piece of fabric, as are the two containers, designated by the reference numeral 16, below the said longitudinal center line. It will be further understood that the containers 13 are joined, as at 17, at any suitable convenient location, and that the said containers have edges sewn or otherwise attached at their extremities to retain the composition stuffed therein. The various containers 13 are stitched together at the center, as designated by the reference numeral 18, and are similarly attached by stitches 18$^a$ to the band 22, which is of tubular construction and is located between the said containers and the inner surface of the tire 10.

The above mentioned containers are of suitable size, when stuffed with ground cork, or any suitable composition, as designated by the reference numeral 14, to fill the said tire 10, as it would appear if an ordinary inner tube were inflated therein.

Referring in particular to Fig. 2 of the accompanying drawing in which I have shown a modification of my improved enclosed core. I have found that tires used on light weight motor vehicles, when equipped with my improved enclosed core, require containers, with sectors of greater included angle, as designated by the reference numeral 19, preferably 60° each, and I therefore use six containers. It will be understood that the two containers, designated by the reference numeral 20, located or lying in the longitudinal center line of the said tire 10, are formed from one piece of fabric.

Referring in particular to Fig. 4, of the accompanying drawing in which I have shown a further modification of my improved enclosed core, I have found that balloon and semi-balloon tires such as commonly used on motor vehicles, when equipped with my improved enclosed core, require containers, as illustrated in the above referred to Fig. 4 of the accompanying drawing. The containers 15 are as hereinbefore described. The two containers, designated by the reference number 21 located or lying in the vertical center line of the tire 10, are sectors having an included angle of 90° each.

Obviously those skilled in the art may make various changes in the details and arrangement of parts without departing from the spirit and scope of the invention as defined by the claims hereto appended.

Having thus described my invention what I claim as new and desire to protect by Letters Patent of the United States is as follows:

1. An enclosed core for motor vehicle tires comprising six containers of sectoral cross section, each having an included angle of 60°, and positioned adjacent each other and secured together along their inner edges, and a band disposed around said containers, said containers being secured at their outer extremities to the said band.

2. An enclosed core for motor vehicle tires comprising a plurality of containers of sectoral cross section positioned adjacent each other and secured together along their inner edges, and a band disposed around said containers, said containers being secured at their outer extremities to said band.

3. An enclosed core for motor vehicle tires comprising a plurality of containers of sectoral cross section positioned adjacent each other and forming a ring of circular cross section, the walls of two of said containers being integral, said containers being secured together at their inner edges.

In testimony whereof I have affixed my signature.

WILLIAM J. OAKLEY.